US009818152B2

(12) United States Patent
Groarke

(10) Patent No.: US 9,818,152 B2
(45) Date of Patent: Nov. 14, 2017

(54) SYSTEM AND METHOD FOR ALLOWING FORWARD-SOLD GOODS PURCHASED VIA CREDIT/DEBIT CARD TO BE RESOLD

(71) Applicant: MASTERCARD INTERNATIONAL INCORPORATED, Purchase, NY (US)

(72) Inventor: Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 570 days.

(21) Appl. No.: 13/655,008

(22) Filed: Oct. 18, 2012

(65) Prior Publication Data

US 2014/0114787 A1 Apr. 24, 2014

(51) Int. Cl.
*G06Q 30/06* (2012.01)
*G06Q 30/08* (2012.01)

(52) U.S. Cl.
CPC .................................... *G06Q 30/08* (2013.01)

(58) Field of Classification Search
CPC ............................... G06Q 30/06; G06Q 30/08
USPC ................................................ 705/26.1, 27.1
See application file for complete search history.

(56) References Cited

U.S. PATENT DOCUMENTS 7,257,581 B1 8/2007 Steele et al.
8,032,765 B2 10/2011 Dettinger et al.
8,037,471 B2 10/2011 Keller et al.
8,311,944 B2 11/2012 Knowles et al.
2001/0043599 A1 11/2001 Redmond
2003/0163483 A1 8/2003 Zingher et al.
2007/0088652 A1* 4/2007 Firmage ............. G06Q 30/0603 705/37
2007/0192229 A1 8/2007 Rowan
2009/0119209 A1 5/2009 Sorensen et al.
2009/0287536 A1 11/2009 Sheng
2010/0076813 A1 3/2010 Ghosh et al.
2010/0114790 A1* 5/2010 Strimling et al. ............ 705/330
2010/0217658 A1* 8/2010 Yankelevich et al. ...... 705/14.13
2011/0125393 A1 5/2011 Williams et al.
2012/0036042 A1 2/2012 Graylin et al.
2012/0150742 A1 6/2012 Poon et al.
2012/0185368 A1 7/2012 Schloter et al.

OTHER PUBLICATIONS

"Benefits of Open Payment Systems and the Role of Interchange", MasterCard Worldwide, U.S. Version, 2008, pp. 1-12.

(Continued)

*Primary Examiner* — James Zurita
(74) *Attorney, Agent, or Firm* — Ohlandt, Greeley, Ruggerio & Perle, L.L.P.

(57) ABSTRACT

A system and a method for the resale of one or more forward-sold goods and/or services allows a transaction to be specified as one in which the goods or services may be resold by the purchaser until a time close to actual delivery. The merchant maintains control of the conditions of the resale. If a resale occurs, the merchant receives a commission. The account of the original purchaser is credited with the resale price minus the commission. The availability of goods for resale can be determined by searching a web site for such goods.

10 Claims, 5 Drawing Sheets

(56) References Cited

OTHER PUBLICATIONS

Christian von Weizsäcker, "Economics of Credit Cards—Expert Report on behalf of MasterCard International Incorporated and Europay International SA", Jan. 23, 2002, pp. 1-29.
John Bulmer, "Payment Systems: The Credit Card Market in Canada", Library Bibliothèque of Parliament du Parlement, Sep. 24, 2009, pp. 1-8.
U.S. Appl. No. 13/537,737, filed Jun. 29, 2012.
U.S. Appl. No. 13/538,226, filed Jun. 29, 2012.
U.S. Appl. No. 13/538,270, filed Jun. 29, 2012.
U.S. Appl. No. 13/538,305, filed Jun. 29, 2012.
U.S. Appl. No. 13/564,321, filed Aug. 1, 2012.
U.S. Appl. No. 13/564,370, filed Aug. 1, 2012.
U.S. Appl. No. 13/564,398, filed Aug. 1, 2012.

* cited by examiner

SYSTEM AND METHOD FOR ALLOWING FORWARD-SOLD GOODS PURCHASED VIA CREDIT/DEBIT CARD TO BE RESOLD

BACKGROUND OF THE DISCLOSURE

1. Field of the Disclosure

The present disclosure relates to the sale of one or more goods and/or services that will be delivered at a time other than when payment is made. More particularly, it relates to a system and a method for facilitating the resale of such goods or services.

2. Description of the Related Art

It is an established practice in several industries for merchants to sell goods or services in advance of their delivery. This is the situation for sporting events, music concerts, the airline tickets, books that have yet to be published, whether in electronic or hard copy form, or the latest model of a particular smart phone. These goods or services, that are sold before they are delivered, are referred to herein as forward-sold goods. Typically, a credit or debit card holder will be charged the price of the forward-sold good at the time of purchase.

Frequently, events occur before the goods or services are actually delivered that may have an impact upon the purchaser or may affect the desirability of the forward sold goods that are purchased. As a general example, a ticket holder may have an unplanned pressing engagement on the day of an event or may otherwise be indisposed. As a particular example, an opera ticket holder's child may become sick on the morning of the opera and the ticket holder can no longer be available to attend the event. Another example is a particular football game between two teams may have become important in deciding which team will go to a playoff. In this case, the desirability of the ticket and its value, which could not have been anticipated at the time of the original sale by the merchant, may have changed drastically. In yet another example, the smart phone that was preordered may have received unfavorable pre-release reviews, or a competitor may have announced the release of a more desirable model.

In all of these cases, it would be desirable to have a system for re-selling the goods or services so that the purchaser could recover at least a portion of, and possibly more than, the price paid.

SUMMARY OF THE DISCLOSURE

There is provided a system and/or method for facilitating the resale of one or more forward-sold goods and/or services (hereinafter referred to as a "good" or "goods").

There is also provided such a system and/or method that allows conditions of the resale of forward-sold goods to be established.

There is further provided such a system and/or method that facilitates the settling of accounts so that a purchaser of forward-sold goods receives at least a partial refund, and possibly more than the purchase price, and the new purchaser is charged for the forward-sold goods.

The present disclosure has a computer readable non-transitory storage medium that stores instructions of a computer program that when executed by a computer system result in performance of steps of the method.

BRIEF DESCRIPTION OF THE DRAWINGS

A component or a feature that is common to more than one drawing is indicated with the same reference number in each of the drawings.

DESCRIPTION OF A PREFERRED EMBODIMENT

Figure 1:
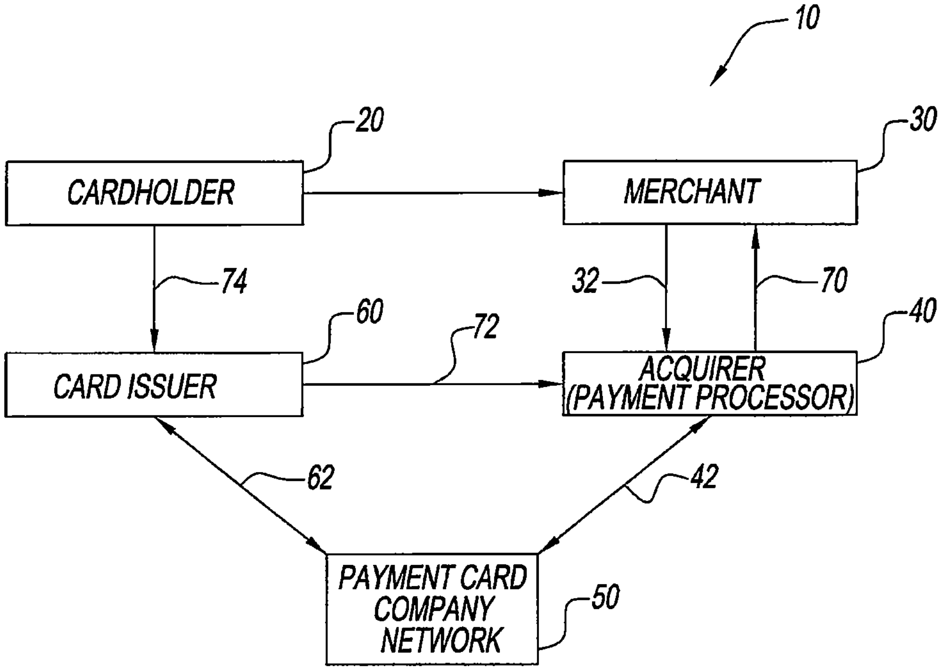
FIG. 1 is a diagram of a four party payment card system.

Referring to the drawings and, in particular, FIG. 1, there is shown a four party payment (credit, debit or other) card system generally represented by reference numeral 10. In card system 10, cardholder 20 submits the payment card to the merchant 30. The merchant's point of sale (POS) device (80 in FIG. 2) communicates 32 with his acquiring bank or acquirer 40, which acts as a payment processor. The sale can be a purchase of one or more goods and/or services (again hereinafter referred to as "good" or "goods"). The acquirer 40 initiates, at 42, the transaction on the payment card network 50. The payment card network 50 routes, via 62, the transaction to the issuing bank or card issuer 60, which is identified using information in the transaction message, more fully described below. The card issuer 60 approves or denies an authorization request, and then routes, via the payment card network 50, an authorization response back to the acquirer 40. The acquirer 40 sends approval to the POS device of the merchant 30. Thereafter, seconds later, the cardholder completes the purchase and receives a receipt.

The account of the merchant 30 is credited, via 70, by the acquirer 40. The card issuer 60 pays, via 72, the acquirer 40. Eventually, the cardholder 20 pays, via 74, the card issuer 60.

Figure 2:
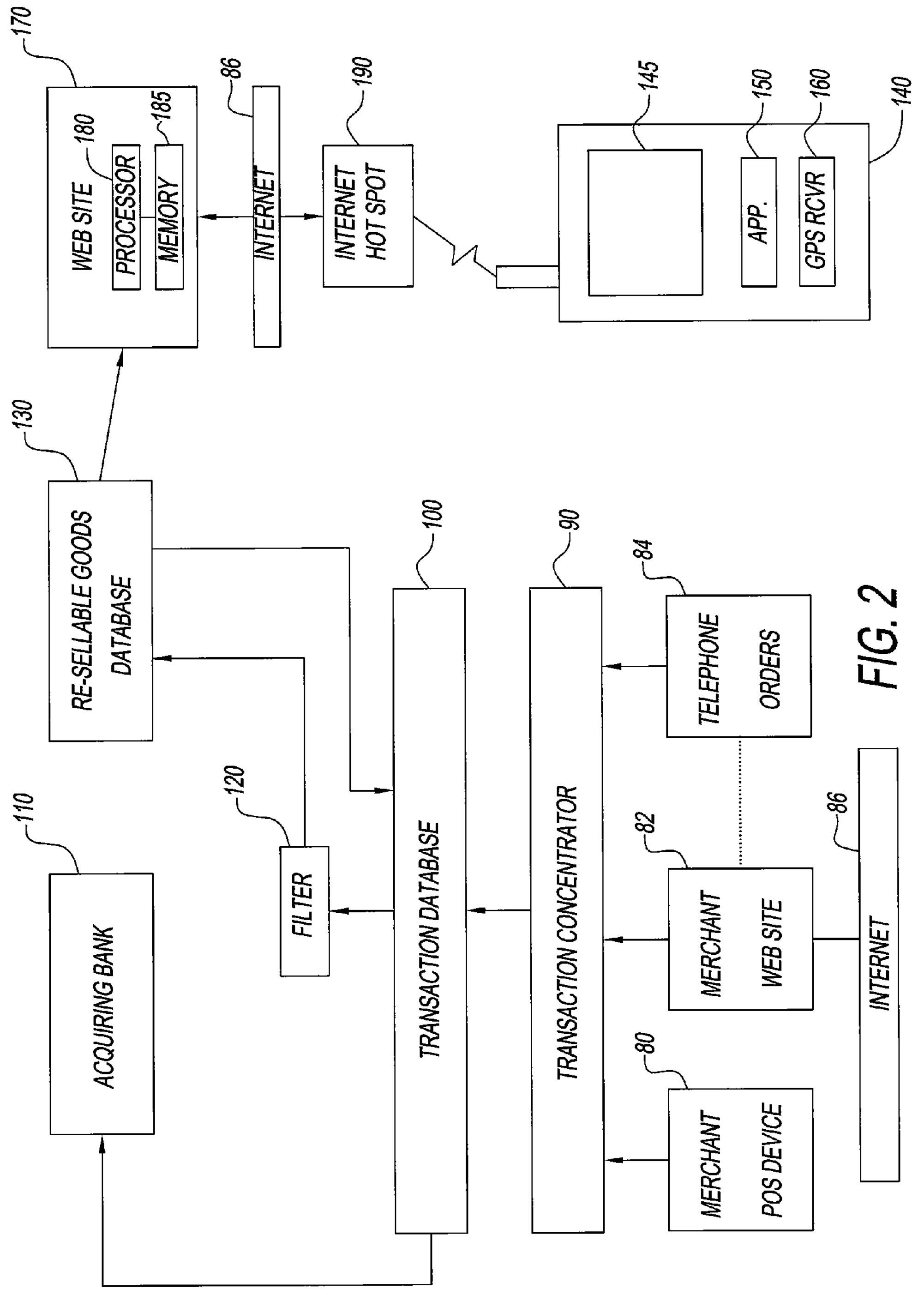
FIG. 2 is a block diagram of a portion of a payment card system modified in accordance with one aspect of the present disclosure.

Referring to FIG. 2, each merchant has on its premises at least one card swiping machine or merchant POS device 80 for initiating customer transactions. A POS device 80 is of a type well known in the art, and generally has a keyboard data entry pad for entering data when a card's magnetic coding becomes difficult to read. A sale may also be made when a customer accesses a merchant's web site 82 via the Internet 86, and makes a purchase in a manner well known in the art. A merchant may also process a telephone order 84 by entering customer information in a device having a keypad similar to merchant POS device 80, including payment card data.

Data representative of a financial transaction, as more fully described below, from merchant POS device 80, merchant web site 82 and from telephone order 84, are transmitted by a suitable network to a transaction concentrator 90, for a given geographic area that concentrates the transaction information. There are many transaction concentrators 90, preferably for different geographic areas. Transaction concentrator 90 forwards the data to a transaction database 100 that stores information concerning the transactions. Data from transaction database 100 is routed to a respective acquiring bank 110 that, in turn, routes the information so that transactions are properly completed using the system illustrated in FIG. 1.

Referring to FIG. 2, data for a relatively large geographic region may be stored in a single database at a central location. This facilitates the resale of a forward-sold good by making information available over a large geographic region, including advantageously, the entire world.

Information that is exchanged across the network for each credit or debit card financial transaction message includes the following characteristics: acquirer identifier/card accepter identifier (the combination of which uniquely defines the merchant); merchant address (i.e., full address and or GPS data); merchant category code (also known as card acceptor business code) that is an indication of the type of business the merchant is involved in (for example, a gas station); local transaction date and time; cardholder base currency (i.e., U.S. Dollars, Euro, Yen, etc.); the transaction environment or method being used to conduct the transaction (as more fully explained below); and product specific data, such as SKU line item data, and cost of the transaction.

In order to facilitate the resale of a forward-sold good (which is generally at the discretion of the merchant) for each transaction, several other characteristics or parameters are also specified. These characteristics include: a flag indicating that the good sold is available for resale; a minimum price for the resale purchase; the maximum price for the resale purchase; auction parameters, such as the last time a bid may be placed for purchase of the good sold; a transaction number that can be used to access all data associated with the transaction including subsequent resale of the good; the number of times the good can be resold; a text searchable, short descriptive name to describe the forward-sold good (or service); and a commission amount that the merchant will receive each time the forward-sold good is resold. By including these parameters, the sale of the forward-sold good is coded for possible resale. Further, these parameters can be entered by the merchant, as desired.

Transaction records stored in transaction database 100 contain information that is highly confidential and must be maintained to prevent fraud and identity theft. The transaction records stored in transaction database 100 are sent through a filter 120 (FIG. 2) that removes confidential information, but retains records concerning merchant identification and the occurrence of transactions at various times, preferably in real time. The filtered data is stored in a re-sellable goods database 130 that may be accessed as described below. The data of the database may be stored in any type of memory, including a hard drive, a flash memory, on a CD, in a RAM, or any other suitable memory.

The following example of an approach to accessing the data involves a mobile telephone. However, it will be understood that there are various other approaches, technologies and pathways that can be used. These include various technologies that may send alerts, such as telephone calls, text messages, instant messages and e-mails, when a forward-sold good or service becomes available for purchase. In instances where the speed of the response is important, as for example when tickets to a sold out concert become available for resale, a so-called "push" technology should be used, where information is "pushed" out to consumers that have access to the system, rather than waiting until the consumer decides to again check for the availability of the good for resale.

A mobile telephone 140 having a display 145 may have a series of applications or applets thereon, including an applet or application program (hereinafter "application") 150 for use with the embodiments described herein. Application 150 can be a browser or a more sophisticated application that provides payment card information, for example, a digital wallet.

Mobile telephone 140 may be used to access a website 170, via an Internet connected Wi-Fi hot spot 190 connected to the Internet 86 (or by any telephone network, such as a 3G or 4G system, on which mobile telephone 140 communicates) by using application 150. Website 170 is linked to re-sellable goods database 130 so that authorized users of website 170 may have access to the data contained therein. The manner in which that access is exploited, in accordance with the present disclosure, is described below.

Web site 170 has a processor 180 for assembling data from re-sellable goods database 130 for: (a) receiving merchant input and responding to merchant inquiries, as more fully discussed with respect to FIG. 4; (b) dealing with requests of purchasers who wish to resell purchased goods, as more fully discussed with respect to FIG. 5; and (c) dealing with requests from consumers to purchase goods available for resale, as more fully discussed with respect to FIG. 6. A memory 185, associated with web site 170, having a non-transitory computer readable medium, stores computer readable instructions for use by processor 180 in implementing the operation of the disclosed embodiment.

The system and method described herein can be used with a mobile device. However, it will be understood that web site 170 may be accessed from a home or business computer, or a personal digital assistant, or any other Internet connected device, such as, a tablet or device (for example, an iPad®).

When web site 170 is accessed and the data in re-sellable goods database 130 is supplemented by a resale transaction, update data concerning the new purchaser is sent from re-sellable goods database 130 to transaction database 100.

Figure 3:
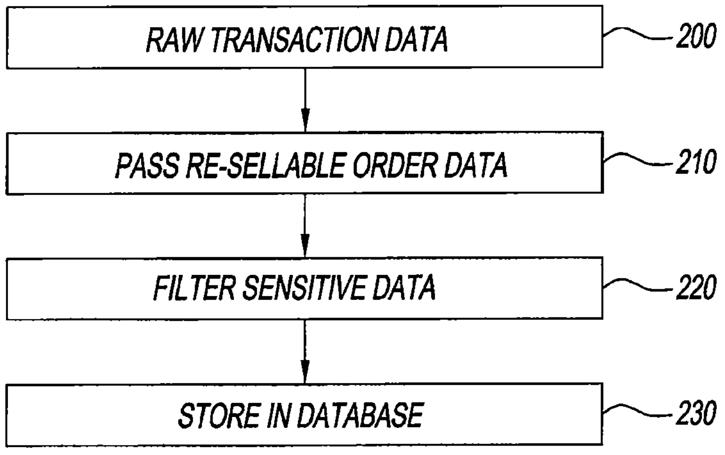
FIG. 3 is a flow chart representing the manner in which acquired data is filtered to select relevant data and to preserve confidentiality.

FIG. 3 describes the operation of filter 120 of FIG. 2. The raw transaction data usually exchanged over the network is acquired at 200. At 210, only transaction data that has been coded for resale of the good purchased is passed for further processing. At 220, customer sensitive information, such as the credit card number/expiration date and any personally identifiable information, is removed. At 230, the remaining data is stored in re-sellable goods database 130 of FIG. 2. After a time, when the forward-sold good has been delivered and used by a final purchaser, data which is no longer current or has become "old" or dated, is removed from the database. This serves to conserve space in the memory associated with re-sellable goods database 130. However, data concerning subsequent sales of the purchased goods is sent to transaction database 100, so that all data concerning a transaction is preserved.

Figure 4:
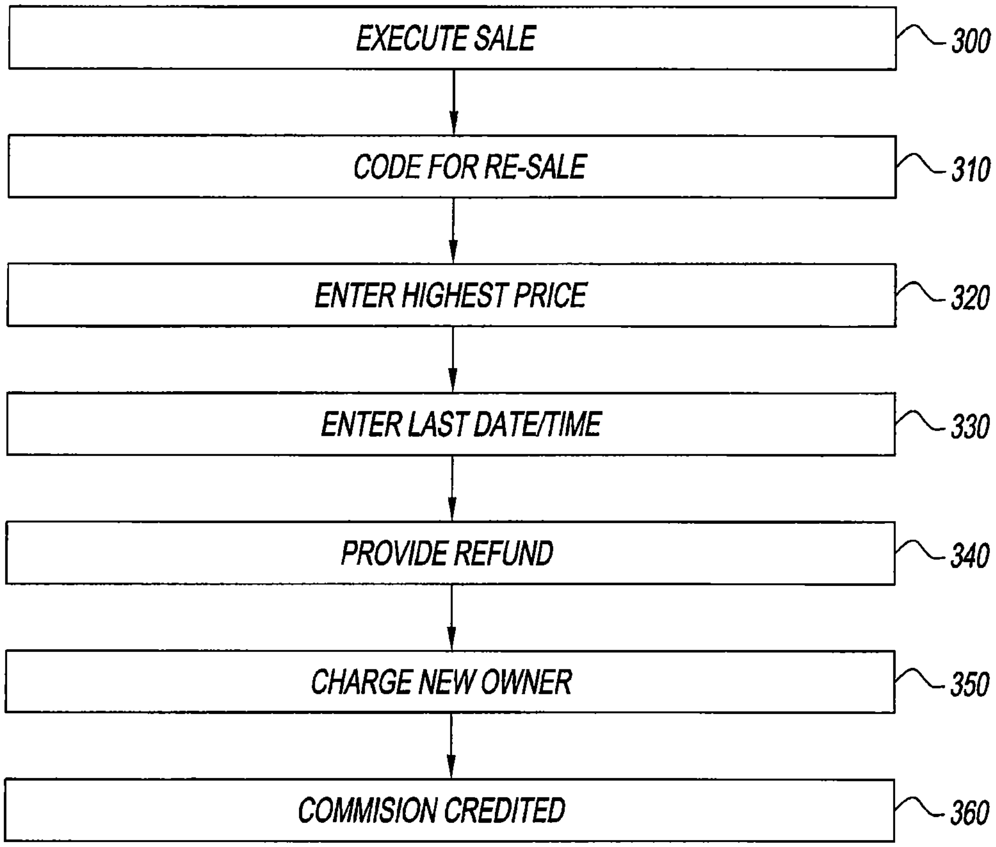
FIG. 4 is a flow chart illustrating the manner in which the system in accordance with the present disclosure is used by a seller of the goods or services to facilitate re-sale.

FIG. 4 illustrates the manner in which the present method or system is used by a merchant to execute a sale 300 as described above with respect to FIG. 2. At 310, at the discretion of the merchant, the sale is coded for permitting the resale of the forward-sold good. At 320, the merchant provides a parameter for the highest price at which the forward-sold good can be resold. This can be important to the merchant for two reasons: (a) the merchant can maintain some control of the price so as not to be regarded as engaging in price gouging; and (b) for some goods, such as event prices for sports events or concerts, there may be local laws (anti-scalping laws) against resale at exorbitant prices. The merchant can best determine the nature of such restrictions on resale price, and can avoid possible fines or other penalties by entering a highest resale price.

At 330, the merchant will enter a last date and time for resale, or in the case of bidding, for submitting a bid, for the good to be resold. There can be practical reasons for specifying a last time that the good can be resold. For example, in order to assure delivery, it may be necessary to stop resale one day before the flight for a ticket for a flight on an airline, or within minutes of the start of a concert, if tickets are delivered to a mobile device in the form of a bar code for use in entering the venue of the event. Assuming the good is resold, at 340, a refund will be provided to the original purchaser (or the latest purchaser if the good, if the good was resold more than one time), reduced by the commission to the merchant for reselling the good. The payment card of the new owner is charged at 350. At 360, the merchant is credited with the commission. The commission can be a percentage of the original purchase price, a percentage of the resale price or a fixed amount.

In the case of international sale and resale, a currency exchange rate will become a factor. The merchant will receive a commission in the currency of the original transaction, and the amount over the commission will be credited to the current owner of the good in the currency used by the account to which the purchase was charged. It is possible that due to changes in currency exchange rates, the current holder of a good that is being sold may receive a windfall, or may receive less than the expected resale price.

Figure 5:
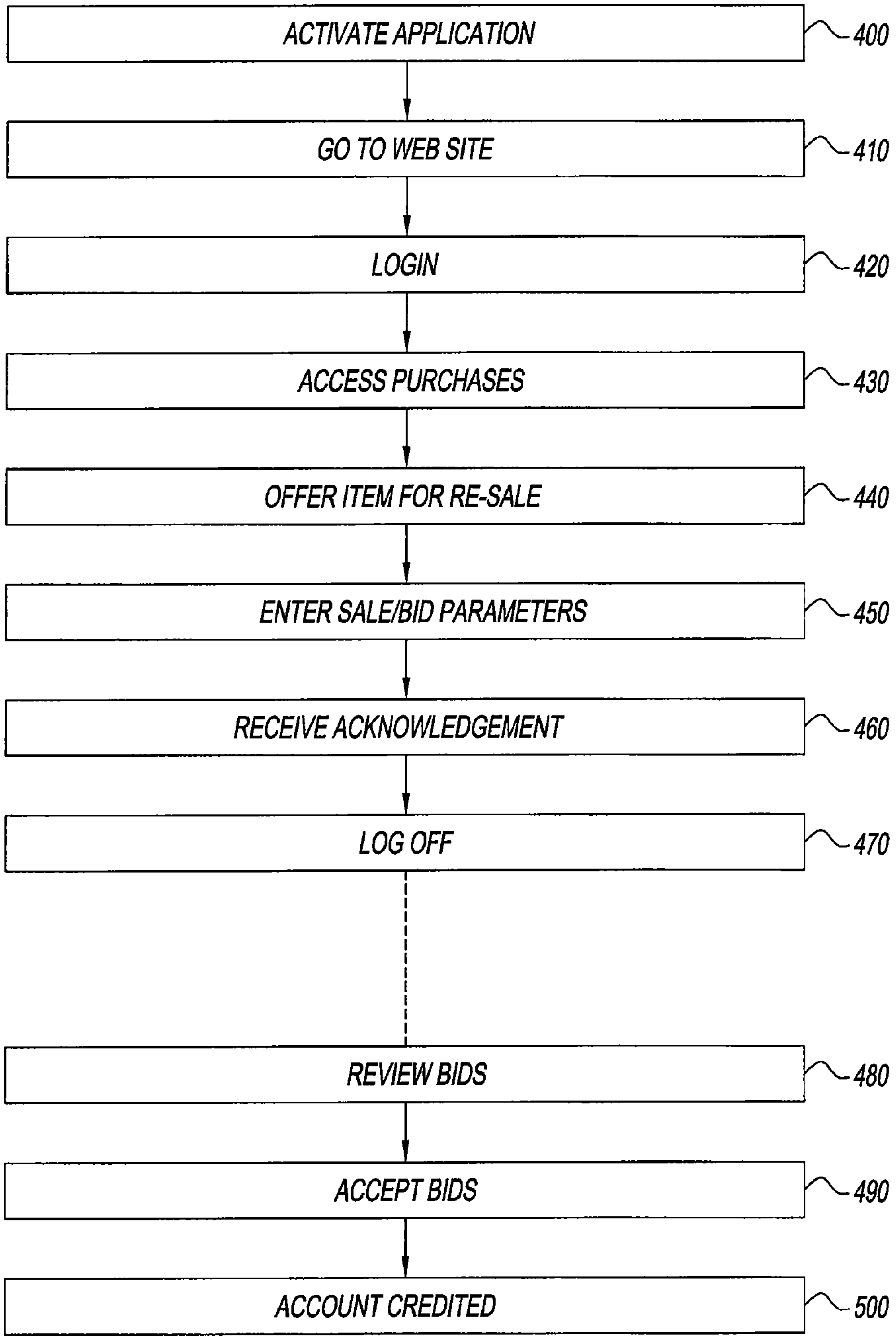
FIG. 5 is a flow chart illustrating the manner in which the system in accordance with the present disclosure is used by a purchaser of goods or services to make goods available for resale.

FIG. 5 is a flow chart that illustrates the system in accordance with the present disclosure that is used by a purchaser of the good to make the good available for resale (for goods that are not resold immediately at the time of original purchase). At 400, the original purchaser or current owner of the forward-sold good (a user of web site 170 of FIG. 2) activates an application on a mobile telephone or a computer with access to the Internet to access at 410 web site 170. The user logs into web site 170 at 420. All purchases made by the user that can be resold are accessed at 430 by the user, under the account that was used. If the good that was sold by the merchant to the user was not coded for resale, the customer can contact the merchant so that the merchant can supplement the information in transaction database 100 to code the transaction for possible resale. This information is forwarded to re-sellable goods database 130. Thus, subject to the approval of the merchant who sold the good, the user can offer a forward-sold good for resale 440 at a time after it was originally sold. Sale or bid parameters, which must be consistent with merchant guidelines, are entered at 450 by the user or may be entered by the merchant. The user may also enter a text searchable, short descriptive name to describe the forward-sold good (or service), if not previously entered. The user receives an acknowledgement 460 of the resale offer, which acknowledgement includes the original transaction number and the resale parameters. The user logs off at 470.

At a later time, the purchaser may log in again to review one or more bids 480 and to accept the one or more bids 490 if multiple goods were offered for resale. In a simple resale situation, if an offer was accepted, the user will be informed of the transaction when logging in or by a push technology, and the account the user had the merchant charge is credited at 500 with the purchase price minus the merchant's commission.

Figure 6:
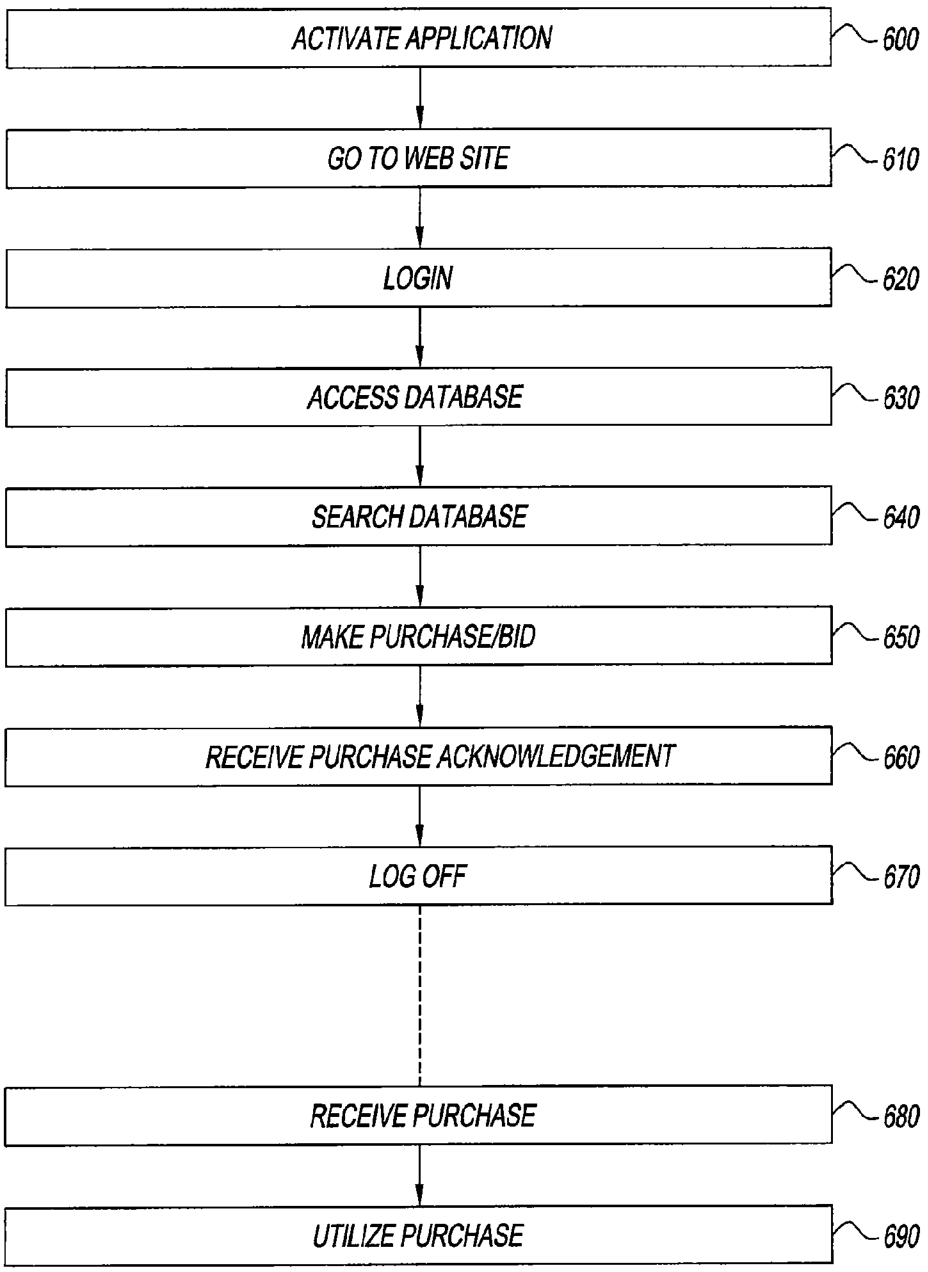
FIG. 6 is a flow chart illustrating the manner in which the system in accordance with the present disclosure is used by a consumer of goods or services to find goods available for resale, and to make a purchase of such goods.

FIG. 6 illustrates the manner the system of the present disclosure is used by a purchaser of one or more goods (or services) to find goods available for resale, and to make a purchase. The user activates an application at 600 on a mobile telephone or a computer with access 610 to the Internet, such as web site 170 of FIG. 2. The consumer logs into web site 170 at 620. At 630, the consumer accesses the re-sellable goods database 130, and using the application on a mobile telephone or computer, does one or more searches of the database at 640 for goods available for resale that are of interest to the user. At 650, the user makes a purchase or bids on one or more goods of interest. An acknowledgement of the bid or purchase is received at 660. The user then logs off 670.

At a later time, the user receives the good purchased 680. The user is then free to utilize the purchase 690.

It will be understood that when a user, such as a consumer, purchases the forward-sold good, that user may again sell the forward-sold good. If there is still time before an event and the number of times a resale is permitted has not been exceeded, the current user may access web site 170 to resell the good again. If the good is not resold, the user becomes the final owner. When the time for resale has expired, the merchant can access transaction database 100, which was updated for each sale, using an application program interface (API), to determine who the final owner is, and to deliver the good to the final owner. This will be accomplished using the primary account number (PAN) of the final owner. In some cases, the final owner will use the payment card corresponding to that account to obtain delivery of the good. For example, a boarding pass for an airline flight may be obtained by inserting the payment card into a kiosk at an airport.

Thus, it is clear that the embodiment described herein benefits users. Specifically, if they are not able to attend an event or utilize a service, there is an opportunity that they may receive a partial refund of their paid price. A subsequent purchaser benefit is the ability to access information concerning the good available for resale, which may have been sold out and is thus unavailable, or the good may be available at a reduced price. The user is not subject to the price gouging of scalpers. The merchant receives the benefit of multiple commissions on a sale, while exercising a great deal of control over the terms of the resale. The payment network permits the enforcement of this control. An acquiring bank and payment network operator receives the benefit of additional revenue due to the one or more additional transactions that occur.

It will be understood that while this embodiment of the present disclosure has been described primarily with respect to the four party payment card system, it can be applied to a three party payment system. Further, with suitable modifications, as will be understood by one skilled in the art, it can be applied to the various kinds of payment card systems, such as credit, debit or prepaid cards.

Significantly, the transaction record is supplemented by all data relating to all subsequent resale of the good. In other words, all subsequent transactions are linked to the reference or transaction number of the original sale. Multiple resale events will result in a "chain" of transactions. Thus it is possible to follow the chain of resales from the original purchase transaction to the final purchase (also a resale) in order to determine the final holder of the good or service.

It will be understood that the disclosure is also directed to a computer readable non-transitory storage medium storing instructions of a computer program which when executed by a computer system results in performance of steps of the method described herein. Such storage media may include any mentioned in the description above.

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system for resale of a forward-sold good, comprising:

a point of sale device communicatively connected to a network, wherein the point of sale device captures raw transaction data from a payment card, the raw transaction data including credit card number, credit card expiration, and personally identifiable information;

an electronic storage device communicatively connected to the network, the electronic storage device having a database of information, the information including the raw transaction data, data concerning the forward-sold good for resale, and parameters for the resale of the forward-sold good, wherein the forward-sold good is a good that (a) is sold to a purchaser, (b) is not delivered to the purchaser, and (c) is for an auction by the purchaser: and a processor communicatively connected to the electronic storage device, the processor configured to:

execute codes to permit resale of forward-sold good;

determine parameters for the resale of the forward-sold good, the parameters including a price, a last time date and time for resale, a bid for the forward-sold good to be sold and a currency exchange rate for international sale;

activate an application by a user on an internet connected device with access to the resale goods database through an internet, wherein the application is executed by the user to perform forward-sold good resale;

filter transaction data by removing customer sensitive information from the raw transaction data, the customer sensitive information including credit card number, credit card expiration, and personal identity personally identifiable information;

determine forward-sold good data by associating the data concerning forward-sold good for resale and the parameters for the resale of the forward-sold good with the filtered transaction data, wherein the data concerning forward-sold good for resale and the parameters for the resale of the forward-sold good correspond to the filtered transaction data;

search the forward-sold good data, the searching based on a request of a user, assemble data found in the searching that includes the forward-sold good data and the parameters for the resale of the forward-sold good that met the request of the user;

send an acknowledge of purchase or the bid to the user after user purchase;

remove the data concerning forward-sold good for resale that is no longer available from the database;

wherein the internet connected device is communicatively coupled to the network and the electronic storage device, and wherein the internet connected device provides the parameters for resale of the forward sold good in the database, the parameters including terms of the resale;

wherein the parameters comprise at least a flag indicating that the forward-sold good is available for resale, a maximum resale price, a time by which a resale must occur, and a commission for the merchant if the forward-sold good; and wherein the parameters further comprise a minimum price for the resale of the forward-sold good, auction parameters for an auction of the forward-sold good, a number of times the forward-sold good can be resold, and a text searchable descriptive name to describe the forward-sold good.

2. The system of claim 1, further comprising:

a web site communicatively coupled to the network for making the data found in the search available to the internet connected device.

3. The system of claim 2, wherein the Internet connected device is one device selected from the group consisting of a mobile telephone, a computer, a tablet, and a personal digital assistant.

4. A method for resale of a forward-sold good, comprising:

receiving raw transaction data from a point of sale device, wherein said raw transaction data includes credit card number, credit card expiration, and personally identifiable information, and wherein said point of sale device is communicatively connected to a network; and storing in an electronic storage device a database of information, the information including the raw transaction data, data concerning forward-sold good for resale, and parameters for the resale of the forward-sold good, wherein the forward-sold good is good that (a) is sold to a purchaser (b) is not delivered to the purchaser, and (c) is for an auction by the purchaser, and wherein the electronic storage device is communicatively connected to a computer configured for:

executing codes to permit resale of forward-sold good;

determining parameters for reselling the forward-sold good, the parameters including a price, a last time date and time for resale, a bid for the forward-sold good to be sold and a currency exchange rate for international sale;

activating an application by a user on an internet connected device with access to the internet to access the resale goods database, wherein the application is executed by the user to perform forward-sold good resale;

filtering transaction data by removing customer sensitive information from the raw transaction data, the customer sensitive information including credit card number, credit card expiration, and personally identifiable information, thus yielding filtered transaction data;

determining forward-sold good data by associating data concerning forward-sold good for resale and the parameters for reselling the forward-sold good with the filtered transaction data, wherein the data concerning forward-sold good for resale and the parameters for reselling the forward-sold good correspond to the filtered transaction data;

searching the forward-sold good data, the searching based on a request of a user;

assembling data found in the searching that includes the data concerning forward-sold good for sale and parameters that met the request;

sending an acknowledge of purchase or the bid to the user after user purchase;

removing the data concerning forward-sold good for resale that is no longer available from the database;

entering parameters for resale of the forward-sold good in the database by a merchant of the forward-sold good;

wherein the parameters comprise a flag indicating that a forward-sold good is available for resale, a maximum resale price, a time by which a resale must occur and a commission for the merchant if the forward-sold good is resold; and wherein the parameters further comprise a minimum price for the resale of the forward-sold good, auction parameters for an auction of the forward-sold good, a number of times the forward-sold good can be resold, and a text searchable descriptive name to describe the forward-sold good.

5. The method of claim 4, further comprising assigning a transaction number to data associated with all transactions relating to the forward-sold good.

6. The method of claim 4, wherein the internet connected device is communicatively connected to a web site that makes the data found in the search available to a user of the web site.

7. The method of claim 6, wherein the Internet connected device is one device selected from the group consisting of a mobile telephone, a computer, a tablet, and a personal digital assistant.

8. The method of claim 4, further comprising entering parameters for resale of the forward-sold good in the database so that the parameters are transmitted by a payment network to control terms of resale of the forward-sold good.

9. A computer readable non-transitory storage medium for storing instructions of a computer program that when executed by a computer enables the resale of a forward-sold good, the medium comprising instructions for:

receiving raw transaction data from a point of sale device, wherein said raw transaction data includes credit card number, credit card expiration, and personally identifiable information, and wherein said point of sale device is communicatively connected to a network;

storing in an electronic storage device a database of information, the information including the raw transaction data, data concerning forward-sold good for resale, and parameters for the resale of the forward-sold good, wherein the forward-sold good is good that (a) is sold to a purchaser (2) is not delivered to the purchaser, and (c) is for an auction by the purchaser the electronic storage device is communicatively connected to the network;

executing codes to permit resale of forward-sold good;

determining parameters for the resale of the forward-sold good, the parameters including a price, a last time date and time for resale, a bid for the forward-sold good to be sold and a currency exchange rate for international sale;

activating an application by a user on an internet connected device with access to the internet to access the resale goods database, wherein the application is executed by the user to perform forward-sold good resale;

filtering transaction data by removing customer sensitive information from the raw transaction data, the customer sensitive information including credit card number, credit card expiration, and personally identifiable information, thus yielding filtered transaction data;

determining forward-sold good data by associating the data concerning forward-sold good for resale and the parameters for the resale of the forward-sold good with the filtered transaction data, wherein the data concerning forward-sold good for resale and the parameters for the resale of the forward-sold good correspond to the filtered transaction data;

searching the forward-sold good data, the searching based on a request of a user;

assembling the forward-sold good data found in the searching that includes the forward-sold good data and the parameters for the resale of the forward-sold good that met the request;

sending an acknowledge of purchase or the bid to the user after user purchase;

removing the data concerning forward-sold good for resale that is no longer available from the database;

entering parameters for resale of the forward-sold good in the database by a merchant of the forward-sold good;

wherein the parameters comprise a flag indicating that a forward-sold good is available for resale, a maximum resale price, a time by which a resale must occur and a commission for the merchant if the forward-sold good is resold; and wherein the parameters further comprise a minimum price for the resale of the forward-sold good, auction parameters for an auction of the forward-sold good, a number of times the forward-sold good can be resold, and a text searchable descriptive name to describe the forward-sold good.

10. The computer readable non-transitory storage medium of claim 9, wherein the internet connected device communicatively connected to a web site that makes the data found in the search available to a user of the web site.

* * * * *